United States Patent [19]

Actor et al.

[11] 3,716,641
[45] Feb. 13, 1973

[54] COCCIDIOSTAT COMPOSITIONS AND METHODS USING AMINOBENZONITRILES

[75] Inventors: Philip P. Actor, Phoenixville; Roger C. Parish, King of Prussia; Vassilios J. Theodorides, West Chester, all of Pa.

[73] Assignee: Smith Kline & French Laboratories, Philadelphia, Pa.

[22] Filed: July 30, 1970

[21] Appl. No.: 59,733

[52] U.S. Cl. ..................................424/251, 424/304
[51] Int. Cl. ...............................................A61k 27/00
[58] Field of Search ............424/304, 251; 260/465 F

[56] References Cited

UNITED STATES PATENTS

| | | | |
|---|---|---|---|
| 2,576,939 | 12/1951 | Hitchings et al. | 260/256.4 |
| 2,579,259 | 12/1951 | Hitchings et al. | 260/256.4 |
| 2,909,522 | 10/1959 | Hitchings et al. | 260/256.4 |
| 3,258,397 | 6/1966 | Hess et al. | 424/304 |
| 3,439,095 | 4/1969 | Hamada et al. | 424/255 |

OTHER PUBLICATIONS

Chemical Abstracts Vol. 52 (1958) 12557h; Vol. 57 (1962) 5479

*Primary Examiner*—Albert T. Meyers
*Assistant Examiner*—Frederick E. Waddell
*Attorney*—William H. Edgerton, Richard D. Foggio, Joan S. Keps, Alan D. Lourie and Joseph A. Marlino

[57] ABSTRACT p-Aminobenzonitriles are active ingredients for compositions and methods useful for the treatment or prevention of various protozoal infections in animals, especially coccidiosis in poultry. Combinations of p-aminobenzonitriles with other aminopyrimidine antiprotozoal agents such as pyrimethamine give a potentiated activity against *Eimeria tenella*. A particularly active chemical ingredient is p-dimethylaminobenzonitrile and its acid addition salts.

24 Claims, No Drawings

COCCIDIOSTAT COMPOSITIONS AND METHODS USING AMINOBENZONITRILES

This invention relates to new antiprotozoal compositions containing p-aminobenzonitriles as active ingredients, methods of using these compositions and combinations of these compositions with other antiprotozoal agents.

Protozoal infections of animals including farm animals are of great social and economic importance. Of particular interest is the problem of coccidiosis in poultry since losses in the chicken industry in the United States alone amount to 45 million dollars yearly. Related protozoan diseases are those caused by Plasmodia (malaria) or Toxoplasma, or Babesia.

The active chemical ingredients used in this invention are p-aminobenzonitriles of the following formula

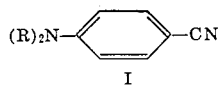

I in which R is hydrogen or lower alkyl of from one to six carbon atoms preferably from one to two carbon atoms. Especially preferred are p-dimethylaminobenzonitrile and p-diethylaminobenzonitrile.

The aminobenzonitriles may also be used as nontoxic addition compounds such as the pharmaceutically acceptable acid addition salts with nontoxic acids, for example the salt with hydrochloric, sulfuric, nitric, phosphoric, sulfamic, maleic, ethanedisulfonic, hydrobromic etc. acids. These are prepared from the bases by standard chemical methods. The water soluble salts are desirable for premixes to be added to drinking water of the animal host for treating or preventing parasitic infections such as coccidiosis in poultry. These water soluble salts may also be added to sterile saline solution for injectable solutions when occasion suggests. In the description hereafter the dosage amounts refer to the free base content of such addition compounds.

To our knowledge these compounds although well-known to the organic chemist as intermediates have never before been known to have useful medicinal activity, certainly not anti-protozoal activity.

The parasites susceptible to the compositions and methods of this invention are the Coccidia in chickens, turkeys and ducks such as *Eimeria tenella, Eimeria meleagrimitis, Eimeria necatrix, Eimeria maxima, Eimeria brunetti, Eimeria gallopavonis* etc.; Plasmodium such as *Plasmodium berghei, Plasmodium gallinaceum, Plasmodium falciparium, Plasmodium vivax* etc.; *Anaplasma marginale, Toxoplasma gondii, Isospora* spp.; *Babesia bigemina*.

The compositions of this invention are most often administered orally in the form of a dosage unit such as a tablet, capsule, troche, aqueous suspension or solution, bolet, etc. or in the case of farm animals especially fowl admixed in the diet or water ration. Such compositions are prepared as known to the art mixed with known excipients or fillers. This preparation is further illustrated by the following description.

Most often for veterinary use the active benzonitrile is mixed with a standard filler for a premix which may later be added to the whole feed. Such fillers may be maize, soya oil, gluten bran, distiller's dried grains, corn meal, citris meal, wheat shorts, clays, mycelia, crushed limestone or an aqueous suspension or solution. The amount of active ingredient in a premix will be about 1–40 percent.

It will be obvious to one skilled in the art that in the veterinary field use is almost exclusively by oral administration. In certain protozoal infections such as malaria rare use is made of parenteral administration. The compositions of this invention may be used both to treat host animals already infected by the parasites or to prevent infections from the environment.

These aminobenzonitriles are formulated and used as described in the Merck Veterinary Manual 3rd Ed. pages 1145–6 or in U.S. Pat. No. 3,461,204. In practice the control of the protozoal infection may be accomplished by internal, preferably oral as noted, administration of the p-amino-benzonitrile chemical ingredient in effective amounts such as 0.001–0.1 percent, advantageously about 0.01–0.1 percent, preferably about 0.05 percent of the feed ration. Somewhat lower, perhaps one-half to one-third of these doses may be used to prevent infection over extended periods of treatment.

In general these compounds can be used in amounts and compositions similar to sulfaquinoxaline a standard anti-protozoal agent and about twice the levels of amprolium, a standard coccidiostat (See U.S. Pat. No. 3,065,132). For example a premix composition of a p-amino-benzonitrile may consist of 25 percent active ingredient as the base extended uniformly in corn meal as filler. Most conveniently the premix is formulated to give one pound of supplement per ton of whole feed.

The premix is then mixed in the feed of an infected flock of chickens at the rate of 0.025 percent. The chickens are allowed to feed ad libitum for 3–5 days, then the rate reduced in half. Very severely infected flocks can be treated with double these doses. Alternatively a water stable acid addition salt for example the hydrochloride or sulfate as a 10 percent solution may be mixed in the drinking water of the flocks at similar levels. An example is the benzonitrile hydrochloride salt mixed with dextrose at 10 percent. This material is then added to the drinking water at levels given above. In practice the active ingredients either alone or combined with other medicaments can be combined with any poultry comestible.

For prophylaxis, similar or lower concentrated premix or whole feed rations may be prepared and used. To develop active immunity, long range use of about one-third to one-quarter of these dose ranges may be employed. Ad libitum feeding is most conveniently used for all coop or lot treatments, prophylactic or curative.

As further illustration of the use of this invention a 100 g. chicken may be treated with a unit dose of about 2 to 200 mg. per kg. body weight per day.

When used as an antimalarial, unit doses of about 25–250 mg. are administered orally from 1–6 times daily. Typical dosage units may consist of 100 mg. of p-dimethylamino-benzonitrile. This amount is mixed with 70 mg. of lactose, 30 mg. of corn starch and 5 mg. of talc then screened and filled into a hard gelatin capsule. A tablet may consist of 200 mg. of p- dimethylaminobenzonitrile. This active ingredient is mixed with 200 mg. of lactose, 100 mg. of corn starch, 15 mg. of gelatin and 10 mg. of magnesium stearate then granulated, dried, screened and tabletted. A parenteral solution might consist of 100 mg. of p-dimethylaminobenzonitrile hydrochloride in 1 ml. of saline water for injection.

One skilled in the art will appreciate from the discussion, the crux of this invention is the discovery that certain p-aminobenzonitriles have a biological profile similar to certain well-known anti-protozoal sulfonamides such as sulfaquinoxaline, sulfamethopyrazine, sulfadimidine, sulfadiazine and sulfadimethoxine.

This unexpected activity resides in compounds of simple chemical structure whose chemical cost is very much lower than such prior art sulfa drugs. This is a major consideration in the veterinary field or in the large anti-parasitic markets as in India, Africa and Latin America.

In addition to this discovery we have also surprisingly found that the anti-protozoal activity of the compounds of Structure I is potentiated to a remarkable degree by certain dihydrofolate reductase inhibitors. Such inhibitors are well-known in medicinal chemistry. See G. H. Hitchings et al., Proc. of the Third International Pharmacological Meeting, Sao Paulo, Vol. 5, page 3.

These highly synergistic combinations are comprised of the p-aminobenzonitriles of Formula I plus a significant quantity of a dihydrofolate reductase inhibitor. For purposes of illustration the most prominent class of such inhibitors is the various aminopyrimidines such as those disclosed in U.S. Pat. Nos. 2,576,939, 2,579,259, 2,602,794, 2,680,740, 2,909,522, 3,049,544, South African No. 65/5618, South African No. 65/5794, British No. 1,149,318 and Netherlands 68/17526. These are generally substituted 5-benzyl and 5-phenyl-2,4-diaminopyrimidines.

Most preferred are the well-known diamino pyrimidine compounds, 2,4-diamino-5-(p-chlorophenyl)-6-ethylpyrimidine (pyrimethamine), 2,4-diamino-5-(4', 5-(4',5'-dimethoxy-2'-methylbenzyl)pyrimidine or 2,4-diamino-5-(3',4',5'ybenzyl)pyrimidine. For the purpose of this disclosure we will use the most commonly known of these compounds, pyrimethamine.

Combinations of the aminobenzonitriles and pyrimethamine also give a better therapeutic index range than available with the individual drugs since the useful level of the pyrimethamine is low. Resistance to the combined drugs is minimized compared with this problem with the use of individual coccidiostats. Also the chemical cost of the combination is kept low by the use of the nitrile component.

The dosage amounts for the two active ingredients will be those levels sufficient to give significant anti-prozoal activity especially against coccidiosis but not high enough to cause toxic or noxious side effects in the host animal.

Generally the combinations will be from about 1:1 to 100:1 preferably about 3:1 to 50:1 of benzonitrile to pyrimethamine.

The combination products of this invention are prepared and used as described above for the benzonitriles. Generally the combinations are most usually used against coccidiosis as an additive to the poultry feed at levels effective but non-toxic to the host animal most usually about 0.01–0.1 percent of benzonitrile and about 0.00125–0.01 percent of pyrimeth-amine. Advantageous ranges are about 0.025 percent of benzonitrile to about 0.0075 percent of pyrimethamine. Especially preferred are ranges of about 0.05 percent to about 0.001 percent. These combinations are used as described by British Pat. No. 1,149,318 for a sulfa and pyrimethamine.

Other anti-protozoal agents may be added to the benzonitrile components useful in the compositions and methods of this invention such as ethopabate, dapsone (as an antimalarial), amprolium, sulfothomidine or the various sulfa drugs mentioned hereabove. For the purposes of this disclosure the term "protozoa" is used to connote organisms of the type exemplified earlier in the disclosure.

EXAMPLE 1

The following experimental method is used. Two groups of 7 three-week-old male broiler chicks weighing ca. 250 grams are fed diets containing an appropriate level of drug beginning 48 hours pre-infection. Non-infected non-medicated and infected non-medicated groups of chicks serve as controls in each study. The weights of the chicks (group weight) is taken on days 3 and 7 post-infection, blood in the droppings is evaluated using a grid (fecal score) on day 4, 5 and 6 post-infection, and the mortality is recorded during the experimental period. The percent weight change, blood in the droppings in the pens, and survival of the infected chicks in relation to the non-infected chicks is calculated. Percent fecal score 100, percent survival 100, and percent weight change 100 or higher in the treated groups are considered idealized efficacies.

| Benzonitrile | Synergist | | Percent Weight change | Percent Fecal score | Percent Survival |
|---|---|---|---|---|---|
| Non-infected, non-medicated control. | | | 100.0 | 100.0 | 100.0 |
| Infected, non-medicated control. | | | 46.6 | 15.4 | 30.0 |
| p-Dimethylamino: | | | | | |
| .025 | | | 82.5 | 86.4 | 100.0 |
| .0125 | | | 42.3 | 35.3 | 100.0 |
| | Pyrimethamine | .004 | 25.3 | 24.7 | 66.7 |
| | Pyrimethamine | .003 | 17.5 | 26.0 | 90.0 |
| p-Dimethylamino: | | | | | |
| .025 | Pyrimethamine | .004 | 84.6 | 98.4 | 100.0 |
| .025 | Pyrimethamine | .003 | 28.8 | 74.4 | 100.0 |
| .0125 | Pyrimethamine | .004 | 64.0 | 98.7 | 100.0 |
| .0125 | Pyrimethamine | .003 | 70.0 | 77.2 | 90.0 |
| .0125 | Pyrimethamine | .002 | 65.1 | 49.3 | 80.0 |
| .025 | Pyrimethamine | .004 | | | |
| | PABA | .025 | 89.0 | 95.4 | 100.0 |

|  |  |  | Percent | | |
| --- | --- | --- | --- | --- | --- |
| Benzonitrile | Synergist | | Weight change | Fecal score | Survival |
| p-Amino: | | | | | |
| .0125 | | | 35.8 | 33.2 | 90.0 |
| .0125 | Pyrimethamine | .004 | 80.8 | 90.7 | 100.0 |
| p-Diethylamino: | | | | | |
| .025 | | | 49.0 | 48.7 | 100.0 |
| .025 | Pyrimethamine | .004 | 71.6 | 56.9 | 100.0 |
| p-Dimethylamino | 41216 [1] | .0075 | 102.4 | 100.0 | 100.0 |
|  | 41216 [1] | .0075 | 60.2 | 20.8 | 90.0 |
| p-Diethylamino: | | | | | |
| .025 | 41216 [1] | .0075 | 80.2 | 77.4 | 100.0 |
| .025 | Trimethoprim | .0075 | 73.2 | 48.3 | 100.0 |

[1] 2,4-diamino-5-(4',5'-dimethoxy-2'-methylbenzyl)pyrimidine.

Conclusions: The most effective combination in treating this highly potent infection is P-dimethylaminobenzonitrile plus 41216 which completely prevented the establishment of infection in the chickens. 41216 alone has little activity and does not completely prevent mortality. Synergistic combinations with pyrimethamine and trimethoprim also showed significantly enhanced weight gains and the fecal score improved. p-Dimethylaminobenzonitrile, p-diethylaminobenzonitrile and p-aminobenzonitrile all show significant activity when used alone.

EXAMPLE 2

Mice in groups of 5 infected intraperitoneally with 1,000,000 erythocytes parasitized with *Plasmodium berghei* are treated with p-dimethylaminobenzonitrile at a dose level of 50 mg per kg. orally for 3 consecutive days, beginning four hours post-infection. These treated mice survive for 14 days while infected nontreated control mice survived 9 days. p-Dimethylaminobenzonitrile significantly increased survival time at this dose level.

What is claimed is:

1. An oral poultry composition in the form of a dosage unit, animal premix or feed composition having activity against coccidiosis comprising an edible carrier and dispersed therein a quantity which is effective against coccidiosis but nontoxic to the poultry host of a compound of the formula:

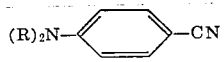

in which R is hydrogen or lower alkyl of one to six carbon atoms.

2. The composition of claim 1 in which R is methyl.
3. The composition of claim 1 in which R is ethyl.
4. The composition of claim 1 in which R is hydrogen.
5. The composition of claim 1 in which the compound is a nontoxic salt of p-dimethylaminobenzonitrile with a pharmaceutically acceptable acid.
6. The composition of claim 1 in which the quantity is about 0.01-0.1 percent by weight of the carrier.
7. The composition of claim 2 in which the quantity is about 0.01-0.1 percent by weight of the carrier.
8. The poultry composition of claim 1 comprising a premix composition having activity against coccidiosis comprising an edible carrier feed and dispersed therein from about 1-40 percent by weight of a compound of the formula defined in claim 1.
9. The poultry feed premix of claim 8 in which the compound is p-dimethylaminobenzonitrile.
10. The poultry feed premix of claim 9 in which the compound is a soluble, nontoxic addition salt of p-dimethylaminobenzonitrile with a pharmaceutically acceptable acid dissolved in an aqueous vehicle.
11. The method of inducing antiprotozoal activity comprising administering orally to a host animal a quantity effective against the infecting protozoa but nontoxic to the host animal of a compound of the formula:

in which R is hydrogen or lower alkyl of one to six carbon atoms.

12. The method of claim 11 in which the protozoa are coccidia.
13. The method of claim 12 in which the compound is p-dimethylaminobenzonitrile.
14. A composition having antiprotozoal activity in a host animal comprising an effective but nontoxic quantity of an aminobenzonitrile compound of the formula:

in which R is hydrogen or lower alkyl of from one to six carbon atoms; a quantity of a dihydrofolate reductase inhibitor sufficient to potentiate the aminobenzonitrile compound but nontoxic to the host animal within the proportions of aminobenzonitrile to inhibitor of from about 1:1 to about 100:1 by weight and an edible carrier therefor.

15. The composition of claim 14 in which the dihydrofolate reductase inhibitor is a substituted 2,4-diamino-5-phenyl or 5-benzylpyrimidine.
16. The composition of claim 14 in which the aminobenzonitrile is p-dimethylaminobenzonitrile and the dihydrofolate reductase inhibitor is pyrimethamine.
17. The composition of claim 14 in which the protozoal infection is coccidiosis.
18. The composition of claim 15 in which the protozoal infection is coccidiosis.
19. The composition of claim 14 in which the aminobenzonitrile is p-dimethylaminobenzonitrile and the inhibitor is 2,4-diamino-5-(4',5'-dimethoxy-2'-methyl-benzyl)pyrimidine.
20. The composition of claim 19 in which the protozoal infection is coccidiosis.
21. A comestible for ad libitum feeding to poultry comprising a poultry comestible containing from about 0.001-0.1 percent by weight of a compound of the formula:

in which R is methyl, ethyl or hydrogen.

22. The comestible of claim 21 which also contains a potentiating quantity of a dihydrofolate reductase inhibitor.

23. The comestible of claim 22 in which the inhibitor is 2,4-diamino-5-(4′,5′-dimethoxy-2′-methylbenzyl)pyrimidine.

24. The comestible of claim 22 in which the inhibitor is pyrimethamine.

* * * * *